(12) United States Patent
Yoneda et al.

(10) Patent No.: US 6,500,553 B1
(45) Date of Patent: Dec. 31, 2002

(54) SUBSTRATE HAVING TREATED SURFACE LAYERS AND PROCESS FOR PRODUCING IT

(75) Inventors: Takashige Yoneda, Kanagawa (JP); Tadashi Hamano, Kanagawa (JP); Fumiaki Gunji, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 29 days.

(21) Appl. No.: 09/712,214

(22) Filed: Nov. 15, 2000

(30) Foreign Application Priority Data

Nov. 16, 1999 (JP) ............................. 11-325565

(51) Int. Cl.⁷ .............................. B32B 9/04; B32B 9/06; B32B 17/06; C09K 3/18
(52) U.S. Cl. ...................... 428/448; 428/429; 428/446; 428/447; 428/450; 427/402; 106/13; 106/14.05
(58) Field of Search ................... 428/447, 448, 428/428, 429, 450; 427/402, 407.1; 106/14.05, 13

(56) References Cited

U.S. PATENT DOCUMENTS

| | | | |
|---|---|---|---|
| 5,314,731 A | * | 5/1994 | Yoneda et al. ............... 428/429 |
| 5,322,557 A | * | 6/1994 | Inomata et al. ........ 106/287.13 |
| 5,783,260 A | * | 7/1998 | Kato et al. ................... 427/379 |
| 5,786,096 A | | 7/1998 | Yoneda et al. |

FOREIGN PATENT DOCUMENTS

| | | |
|---|---|---|
| EP | 0 513 690 | 11/1992 |
| EP | 0 759 413 | 2/1997 |
| EP | 0 891 953 | 1/1999 |
| JP | 7-252472 | 10/1995 |
| JP | 10-194784 | 7/1998 |

* cited by examiner

*Primary Examiner*—Robert Dawson
*Assistant Examiner*—Michael J Feely
(74) *Attorney, Agent, or Firm*—Oblon, Spivak, McClelland, Maier & Neustadt, P.C.

(57) ABSTRACT

A substrate having at least two treated surface layers, wherein the first layer constituting the outermost layer among the treated surface layers is a layer formed by covering with a composition containing a reactive silane compound (I) which forms a surface having a rolling angle of at most 30° to water, and the second layer constituting an underlayer in contact with the first layer is a layer formed by covering with a composition (II) containing a fluorine-containing reactive silane compound (II) which forms a surface having a contact angle of at least 100° to water.

16 Claims, No Drawings

SUBSTRATE HAVING TREATED SURFACE LAYERS AND PROCESS FOR PRODUCING IT

The present invention relates to a substrate having treated surface layers, on which water drops scarcely attached or from which attached water drops can easily be removed, and a process for producing it.

Various substrates having treated surface layers are used in various fields, and adverse effects brought about by water on the surface of such substrates are problematic.

For example, in transportation equipments such as electric cars, automobiles, ships or aircrafts, the surface of 1) an exterior part such as an outer panel, a window glass, a mirror or a display surface material, 2) an interior part such as an instrument panel, or 3) other articles, is desired to be always clean. If e.g. raindrops, dusts or soils are deposited on the surface of an article in a transportation equipment, or moisture is condensed thereon due to the temperature or humidity in the air, basic functions of the article in a transportation equipment may be impaired in some cases.

Especially in a case where the article for a transportation equipment is an article for which transparency or see-through property is required (such as a window glass or a mirror), a deterioration of the transparency or see-through property due to attachment of e.g. raindrops, dusts or soils, or concentration of moisture, may impair the purpose intended by the article. For example, on a windshield of an automobile, transparency and see-through property may be impaired due to e.g. attachment of e.g. raindrops.

Means to physically remove water drops (such as removal by wiping off or by means of a wiper) may sometimes impart fine scratch marks on the surface of an article. Further, such scratch marks may sometimes be widened by foreign particles accompanying such water drops. Furthermore, it is well known that when moisture is attached to a glass surface, glass components are likely to elute into the moisture, whereby the surface will be eroded, thus leading to so-called scorching. If the surface is strongly polished or abraded to remove such scorching, a fine roughness is likely to form. At the see-through portion made of glass having substantial scorching or a fine roughens on its surface, its basic function is lowered, and scattering of light on its surface tends to result.

Further, moisture is likely to give a hazardous influence to the surface or the inside of e.g. an article for a transportation equipment and to promote damages, soiling, yellowing or corrosion. Otherwise they may induce a change in the electrical characteristics, the mechanical properties or the optical properties of the article for a transportation equipment. Further, the appearance of such an article may be impaired in some cases, and if it is a surface which is directly visually observed or which is directly touched by a person, the impairment in appearance may give a filthy impression.

Adverse effects of this type due to water are problematic not only in the field of articles for transportation equipments but also in various fields including articles for building or building decoration or articles for electric or electronic equipments.

Under these circumstances, it is strongly desired to impart to the substrate surface a characteristic such that water drops scarcely attach to the substrate surface or attached water drops can easily be removed (hereinafter referred to simply as a water drop removal property). Heretofore, to impart a water drop removal property to a surface, surface treating agents for direct application to the surface of an article, such as a silicone wax, a silicone oil made of organopolysiloxane and a surfactant, have been proposed.

JP-A-58-147484, JP-A-60-221470 and JP-A-4-96935 disclose that a polysiloxane and a polysilazane having a perfluoroalkyl group are excellent in water repellency.

However, they are poor in abrasion resistance and weather resistance, and could not be used outdoors for a long period of time. Further, for e.g. a windshield of an automobile or a window glass for building, not only water repellency but also such a characteristic that water drops roll down on its surface (water drop rolling property) is required. However, they do not necessarily have adequate water drop rolling property.

Further, JP-A-10-194784 proposes a water repellent glass which comprises a glass plate, a base film made of a silicon oxide having part of oxygen atoms replaced with hydroxyl groups, and an organic silicon compound containing a fluoroalkyl group.

The above water repellent glass is excellent in abrasion resistance, but is poor in weather resistance practically. Further, the water drop rolling property is not sufficient.

Further, JP-A-7-252472 discloses a water repellency agent containing a co-hydrolyzate of a perfluoroalkyl group-containing organic silicon compound and a hydrolyzable group-containing methylpolysiloxane. This is obtained by co-hydrolyze a perfluoroalkyl group-containing organic silicon compound which is excellent in water repellency and a hydrolyzable group-containing methylpolysiloxane which is excellent in water drop rolling property, in water and a hydrophilic solvent, so as to obtain one which is excellent in both water repellency and water drop rolling property.

However, if the above water repellency agent is coated on a substrate, until it completely gets dry, the perfluoroalkyl group-containing organic silicon compound having a low surface energy tends to move outside the hydrolyzable group-containing methylpolysiloxane having a high surface energy, and no desired water drop rolling property intended by the latter tends to be obtained.

Further, many of surface treating agents which have conventionally been proposed require a pre-treatment accompanying coating, and the coating tends to be nonuniform. Further, the adhesion of the treating agents themselves to the substrate is low, and their water drop removal property can not be maintained for a long period of time. Thus, the range of their application has been limited.

Further, it is desired to develop a means of imparting such water drop removal property not only to substrates to be produced anew but also to substrates which have already been used. In such a case, the surface treating agent must be capable of imparting water drop removal property simply by directly coating such substrates with the surface treating agent at room temperature. For example, when it is attempted to apply a treatment of imparting water drop rolling property to a windshield for an automobile which has already been used, it is impossible to replace the windshield of each automobile from the economical reason, and it is practically impossible to subject the portion to baking after coating. Accordingly, with conventional means using a surface treating agent, such a treatment is difficult.

Under these circumstances, the present invention has been made to overcome the above problems. Namely, the present inventors have conducted studies on a treating agent which will overcome conventional problems, and have found a means of surface treatment which can be applied to a variety of substrates, and which will impart long lasting excellent water drop removal property (water drop rolling property and water repellency). They have further found that said treatment can be carried out easily, and that the substrate thus treated, having water drop removal property, is particularly suitable as a substrate for a transportation equipment. The present invention has been accomplished on the basis of these discoveries.

It is an object of the present invention to provide a substrate which has water drop removal property, which is excellent in abrasion resistance, weather resistance, boil-proof property and chemical resistance, and whose characteristics thereby last semipermanently.

The present invention provides a substrate having at least two treated surface layers, wherein the first layer constituting the outermost layer among the treated surface layers is a layer formed by covering with a composition containing a reactive silicon-containing compound (I) which forms a surface having a rolling angle of at most 30° to water, and the second layer constituting an underlayer in contact with the first layer (on the substrate side) is a layer formed by covering with a composition (II) containing a fluorine-containing reactive silane compound (II) which forms a surface having a contact angle of at least 100° to water.

The compounds (I) and (II) preferably satisfy the relation of [fluorine content in the compound (I)]/[fluorine content in the compound (II)]<1.0, more preferably the relation of [fluorine content in the compound (I)]/[fluorine content in the compound (II)]≦0.8, where the fluorine content (%) is defined as [(the number of F atoms in a compound)×(atomic weight of F)]/[molecular weight of a compound]×100.

The compounds (I) and (II) preferably satisfy the relation of [molecular weight of the compound (I)]/[molecular weight of the compound (II)]<1.0, more preferably the relation of [molecular weight of the compound (I)]/[molecular weight of the compound (II)]≧1.5.

The compound (I) is preferably a compound represented by the following formula (IA):

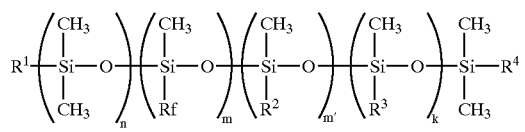

wherein each of $R^1$, $R^3$ and $R^4$ is a group represented by the following formula (1), provided that $R^1$, a k number of $R^3$'s and $R^4$ may be the same or different, $R^2$ is a $C_{2-16}$ monovalent organic group, provided that a m' number of $R^2$'s may be the same or different, Rf is a $C_{3-16}$ monovalent fluorine-containing organic group, provided that a m number of Rf's may be the same or different, each of n, m' and k is an integer of from 0 to 100, m is an integer of from 1 to 100, and n+m+m'+k is an integer of from 2 to 101;

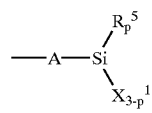

wherein A is a $C_{2-6}$ bivalent hydrocarbon group or an oxygen atom, $R^5$ is a $C_{1-10}$ monovalent hydrocarbon group, $X^1$ is an isocyanate group, a chlorine atom, a $C_{1-4}$ alkoxy group or a $C_{1-4}$ acyloxy group, provided that a p number of $R^5$'s may be the same or different, and a (3-p) number of $X^1$'s may be the same or different, and p is an integer of from 0 to 2.

The above fluorine-containing reactive silane compound (II) is represented preferably by the following formula (IIA) and/or (IIB):

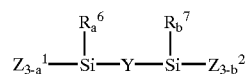

wherein each of $Z^1$ and $Z^2$ is an isocyanate group or a hydrolyzable group, provided that a (3-a) number of $Z^1$'s and a (3-b) number of $Z^2$'s may be the same or different, each of $R^6$ and $R^7$ is hydrogen or a $C_{1-21}$ organic group, provided that a a number of $R^6$'s and a b number of $R^7$'s may be the same or different, Y is a bivalent organic group, provided that at least one of the group of a a number of $R^6$'s, a b number of $R^7$'s and Y is a fluorine-containing organic group, and each of a and b is an integer of from 0 to 2;

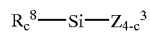

wherein $R^8$ is hydrogen or a $C_{1-21}$ organic group, provided that a c number of $R^8$'s may be the same or different and at least one of a c number of $R^8$'s is a fluorine-containing organic group, $Z^3$ is an isocyanate group or a hydrolyzable group, and c is an integer of from 1 to 3.

The present invention further provides the above substrate having treated surface layers, which further has a third layer constituting an underlayer in contact with the second layer (on the substrate side), wherein the third layer is a layer formed by covering with a composition (III) containing a reactive silane compound (III) containing no fluorine.

The present invention further provides a process for producing the above substrate having treated surface layers, which comprises a step of covering the surface of the substrate with the above composition (II) to form the second layer, and a step of covering the surface of the second layer with the above composition (I) to form the first layer.

The present invention further provides a process for producing the above substrate having treated surface layers, which comprises a step of covering the surface of the substrate with the above composition (III) to form the third layer, a step of covering the surface of the third layer with the above composition (II) to form the second layer, and a step of covering the surface of the second layer with the above composition (I) to form the first layer.

Now, the present invention will be described in detail with reference to the preferred embodiments.

The substrate of the present invention is a substrate having at least two treated surface layers.

The first layer constituting the outermost layer among the treated surface layers is a layer formed by covering with a composition (I) containing a reactive silicon-containing compound (I).

The reactive silicon-containing compound (I) is not particularly limited so long as it is a compound which forms a surface having a rolling angle of at most 30° to water. Here, "a compound which forms a surface having a rolling angle of at most 30° to water" is such a compound that when the surface of a washed soda lime glass substrate is completely covered with said compound so that the surface of the substrate is not exposed, the rolling angle of the surface is brought to be at most 30° to water after the covering. "Rolling angle" is obtained in such a manner that 50 μl of water drops are dropped on the surface of a substrate which is held horizontally, and one side of the substrate is lifted up and gradually inclined, and the angle between the substrate surface and a horizontal plane at which the water drops start to roll is read. The smaller the angle, the more excellent the water drop removal property of the substrate on its surface.

Further, the compound (I) is preferably a compound which forms a surface having a contact angle of at least 90° to water, from the viewpoint of water drop removal property. "A compound which forms a surface having a contact angle of at least 90° to water" is such a compound that when the surface of a washed soda lime glass substrate is completely covered with said compound so that the surface of the substrate is not exposed, the contact angle of the surface is brought to be at least 90° to water after the covering.

In the compound (I), its reactive group is directly bonded to the silicon atom. The reactive group may, for example, be an isocyanate group, a halogen atom (excluding F), an alkoxy group, an acyloxy group, an alkoxy-substituted alkoxy group, an aminoxy group, an amide group, an acidamide group or a ketoxymate group. Among them, preferred are a $C_{1-4}$ alkoxy group, an acyloxy group, an isocyanate group and a chlorine atom. The number of the reactive group bonded to one silicon atom is preferably at least two in view of affinity to the second layer.

The compound (I) is considered to present excellent performances such as water drop removal property, abrasion resistance, chemical resistance and weather resistance, due to reactivity of said reactive group. Further, it is possible to further improve such performances by selecting an organic group as mentioned hereinafter.

The compound (I) may be used as it is, or may be used as a hydrolyzate. The hydrolyzate of the compound (I) is a compound having e.g. a silanol group, formed by hydrolyzing a part or whole of the reactive groups of the compound (I) in water or in an acidic or alkaline aqueous solution, or a compound having at least two molecules condensed due to reaction of the silanol groups. The acidic aqueous solution may, for example, be an aqueous solution of e.g. hydrochloric acid, acetic acid, sulfuric acid, phosphoric acid, sulfonic acid or methanesulfonic acid. The alkaline aqueous solution may, for example, be an aqueous solution of e.g. sodium hydroxide, potassium hydroxide or ammonia.

As mentioned above, the compound (I) is not particularly limited structurally so long as it is a compound which forms a surface having a rolling angle of at most 30° to water. However, it is preferably a reactive silicon-containing compound having a lower fluorine content than the compound (II) and having a higher molecular weight than the compound (II) (i.e. a reactive silicon-containing compound which satisfies the relation of [fluorine content in the compound (I)]/[fluorine content in the compound (II)]<1.0, and which satisfies the relation of [molecular weight of the compound (I)]/[molecular weight of the compound (II)] >1.0. Here, the fluorine content (%) is defined as [(the number of F atoms in a compound)×(atomic weight of F)]/[molecular weight of a compound]×100. The compound (I) may be either a reactive silicon-containing compound containing no fluorine or a fluorine-containing reactive silicon-containing compound, and in the case where the compound (I) is a reactive silicon-containing compound containing no fluorine, its fluorine content is 0%.

Here, in a case where the composition (I) contains at least two types of the compounds (I), the above fluorine content and the molecular weight may be the averages taking the molar fraction into consideration. This applies to a case where the composition (II) contains at least two types of the compounds (II).

Now, the reason will be explained below why the compound (I) is preferably a reactive silicon-containing compound having a lower fluorine content than the compound (II) and having a higher molecular weight than the compound (II).

Of general water repellent materials of fluorine-containing type, the water repellency and durability on the surface tend to improve along with increase in the fluorine content, but the water drop rolling property on the surface does not necessarily increase. This is considered to be because the electron density of fluorine atoms is high, whereby the interaction between the water drops and the surface tends to be strong. Further, as a water repellent material having a good water drop rolling property, a dimethylpolysiloxane type compound may, for example, be mentioned, but it has a drawback in poor chemical durability.

From the viewpoint to obtain a substrate having a surface excellent in all of water repellency, durability and water drop rolling property, it is preferred to realize an inclined layer wherein the fluorine atoms stepwise or continuously decrease from the inside towards the outside surface side in the vicinity of the substrate surface, and to employ such a constitution that the compound (I) has a lower fluorine content than the compound (II). In order to realize such an inclined layer on the surface, a treatment with a mixture of a fluorine type water repellent material and a dimethylpolysiloxane type water repellent material is considered. However, in such a case, the fluorine type water repellent material having a small surface energy tends to be present at the outside surface side with a high density, whereby no desired inclined layer tends to be obtained.

On the other hand, if the fluorine content in the compound (I) becomes low, the surface energy tends to be higher than the surface of the second layer having a high fluorine content, and the compound (I) is less likely to get wet. Accordingly, it becomes difficult to cover the surface of the second layer with the composition (I) containing the compound (I).

In the present invention, it is preferred that the molecular weight of the compound (I) is higher than the compound (II), whereby van der waals force between the compound (I) and the surface of the second layer generated during the surface treatment of the first layer tends to be strong, and the covering with the composition (I) tends to be easy.

In the present invention, the compounds (I) and (II) preferably satisfy the relation of [fluorine content in the compound (I)]/[fluorine content in the compound (II)]≦0.8, whereby the water drop rolling property tends to be extremely excellent. Further, the compounds (I) and (II) preferably satisfy the relation of [molecular weight of the compound (I)]/[molecular weight of the compound (II)] ≧1.5, whereby the surface treatment with the composition (I) tends to be very easy.

The compound (I) is preferably a fluorine-containing compound represented by the above formula (IA). In the formula (IA), each of $R^1$, $R^3$ and $R^4$ is a group represented by the above formula (1) (wherein A is a $C_{2-6}$ bivalent hydrocarbon group or an oxygen atom, $R^5$ is a $C_{1-10}$ monovalent hydrocarbon group, preferably a methyl group, $X_1$ is an isocyanate group, a chlorine atom, a $C_{1-4}$ alkoxy group or a $C_{1-4}$ acyloxy group, provided that a p number of $R^5$'s may be the same or different, a (3-p) number of $X^1$'s may be the same or different, and p is an integer of from 0 to 2), provided that $R^1$, a k number of $R^3$'s and $R^4$ may be the same or different, $R^2$ is a $C_{2-16}$ monovalent organic group, provided that a m' number of $R^2$'s may be the same or different, Rf is a $C_{3-16}$ monovalent fluorine-containing organic group, provided that a m number of Rf's may be the same or different, each of n, m' and k is an integer of from 0 to 100, m is an integer of from 1 to 100, and n+m+m'+k is an integer of from 2 to 101.

p is an integer of from 0 to 2, but is preferably at most 1, more preferably 0, from the viewpoint of adhesion to the second layer. The larger the number of $X^1$'s in $R^1$, $R^3$ and $R^4$, the more strongly the first layer is bonded to the second layer.

$R^2$ is preferably a hydrocarbon group such as an alkyl group, an alkenyl group, a cycloalkyl group or an aryl group; a halogenated hydrocarbon group such as a chloroalkyl group or a fluoroalkyl group; a (halogenated) hydrocarbon group having a hydroxyl group, an epoxy group, an amino group, a mercapto group, a carboxyl group or another functional group; or a (halogenated) hydrocarbon group having an ester linkage, an ether linkage, a thioether linkage, a imino linkage, an amide linkage, a urethane linkage or another linkage in the carbon chain. Among them, preferred is a $C_{2-16}$ alkyl group.

Rf is bonded to the silicon atom preferably by means of a carbon atom having no fluorine atom (such as a carbon atom in a methylene group, an ethylene group or a propylene group).

Rf is preferably a polyfluoroorganic group, particularly preferably a polyfluoroalkyl group, a polyfluorooxaalkyl group or a polyfluorothioxaalkyl group; or an organic group having one of these groups and a hydrocarbon group such as an alkylene group bonded by means of an ester linkage, an ether linkage, a thioether linkage, an imino linkage, an amide linkage, a urethane linkage or another linkage (said organic group is bonded to the silicon atom at another terminal of the hydrocarbon group). The polyfluoroalkyl group and the polyfluorooxaalkyl group preferably have a perfluoro moiety and are bonded to the silicon atom by means of an alkylene group (particularly a dimethylene group). The perfluoro moiety is preferably a perfluoroalkyl group, a perfluorooxaalkyl group or a perfluorothioxaalkyl group, having a carbon number of at least 3, particularly preferably a $C_{3-16}$ perfluoroalkyl group.

Now, specific examples of the compound (IA) will be shown below. In the following formulae, the symbols are as defined above.

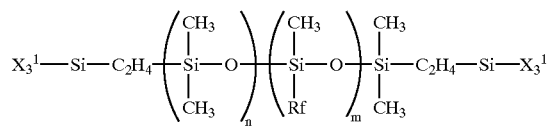
(IA-1)

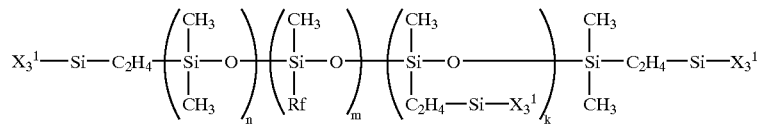
(IA-2)

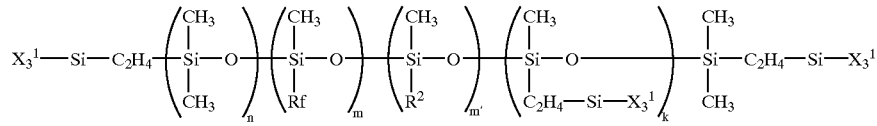
(IA-3)

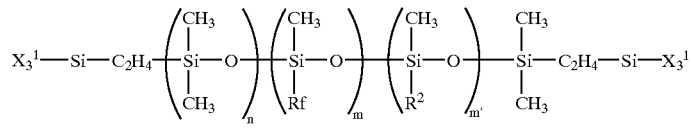
(IA-4)

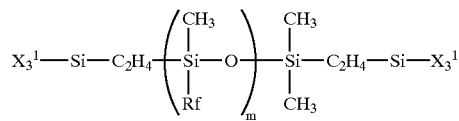
(IA-5)

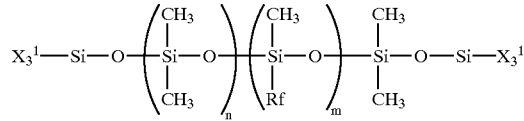
(IA-6)

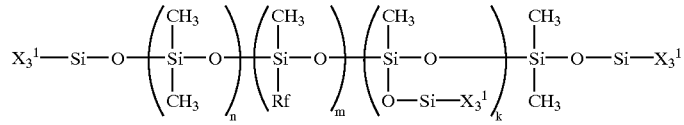
(IA-7)

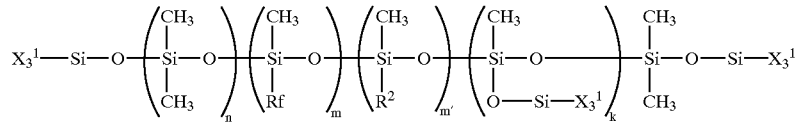
(IA-8)

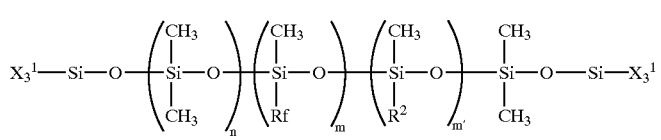
(IA-9)

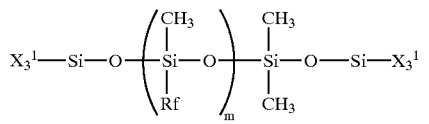
(IA-10)

The composition (I) may contain one type of the compound (I), or may contain at least two types of the compounds (I).

The composition (I) may contain another compound or additive in addition to the above components, depending upon the purpose. The additive etc. may be selected taking the reactivity and compatibility with the other components into consideration. It may, for example, be ultrafine particles of a metal oxide such as silica, alumina, zirconia or titania; or a resin. Further, a dye, a pigment etc. may be incorporated in a case where coloring is required. The amount of the additive etc. added may be a level of from 0.01 to 20 parts by weight based on 100 parts by weight of the compound (I), and an excessive addition may decrease the water drop removal property, abrasion resistance etc. of the substrate of the present invention.

The composition (I) may be used as it is, or may be diluted with an organic solvent as the case requires, taking workability and the desired thickness of the first layer into consideration.

The organic solvent is not particularly limited so long as it dissolves the other essential components. It may, for example, be an acetate, an aromatic hydrocarbon, a halogenated hydrocarbon, a ketone, an ether or an alcohol. However, in a case where the compound (I) has a highly reactive group such as an isocyanate group or a chlorine atom, a solvent having an active proton (a hydrogen atom in e.g. a hydroxyl group) is unfavorable. The organic solvent is not limited to one type, and a solvent mixture of two or more solvents having different polarity, vapor pressure etc. may also be used.

The content of the organic solvent in the composition (I) is determined taking moldability (workability) of the coating film, the stability, the thickness of the coating film and economical efficiency into consideration, but it is preferably from 100 to 10,000 parts by weight based on 100 parts by weight of the compound (I).

By covering with the composition (I), the compound (I) contained in the composition (I) is chemically and/or physically bonded to the surface of the second layer. The compound (I) is a compound having at least one reactive group in its molecule, and is considered to be bonded to the surface of the second layer mainly by a chemical reaction. Namely, it is considered that the compound (I) is bonded to the surface of the second layer by formation of a bond between said reactive groups and reactive groups remaining on the surface of the second layer such as silanol groups.

At the same time, it is estimated that the compound (I) is strongly bonded to the surface of the second layer due to mixing (interdiffusion) with unreacted (uncombined) molecules remaining on the surface of the second layer. It is considered that the formation of mixing (interdiffusion) is proved from the fact that a high contact angle is obtained in the present invention wherein the surface of the second layer is covered with the composition (I), as compared with a case where a substrate having no second layer is directly treated with the composition (I).

For covering the surface of the second layer with the composition (I), no special pre-treatment is required. Preferably, the first layer is formed immediately after the second layer is formed as mentioned hereinafter. The formation of the first layer by covering with the composition (I) is carried out in such a manner that the surface is coated with the composition (I) by means of a known method such as brush coating, flow coating, spin coating, dip coating, squeegee coating, spray coating or hand coating, followed by drying in the air or in a stream of nitrogen. Depending upon the treating method, an excess component may result and impair the quality in appearance. In such a case, the excess component may be wiped off with a solvent or with a dry cloth to neaten the appearance. The thickness of the first layer to be formed by this surface treatment is not particularly limited, but it is preferably at most 100 nm (particularly preferably at most 50 nm) in view of economical efficiency. Further, the lower limit is a thickness of a monomolecular layer.

The second layer constituting an underlayer in contact with the first layer is a layer formed by covering with the composition (II) containing a fluorine-containing reactive silane compound (II) which forms a surface having a contact angle of at least 100° to water.

The fluorine-containing reactive silane compound (II) which is an essential component for the composition (II) is a reactive silane compound having a fluorine-containing organic group, and is a compound which forms a surface having a contact angle of at least 100° to water. Here, "a compound which forms a surface having a contact angle of at least 100° to water" is such a compound that when the surface of a washed soda lime glass substrate is completely covered with said compound so that the surface of the substrate is not exposed, the contact angle of the surface is brought to be at least 100° to water after the covering.

In the compound (II), its reactive group is directly bonded to the silicon atom. The reactive group may, for example, be an isocyanate group, a halogen atom (excluding F), an alkoxy group, an acyloxy group, an alkoxy-substituted alkoxy group, an aminoxy group, an amide group, an acidamide group or a ketoxymate group. Among them, preferred are a $C_{1-4}$ alkoxy group, an acyloxy group, an isocyanate group and a chlorine atom. The number of the reactive group bonded to one silicon atom is preferably at least two in view of affinity to the substrate or a treated surface layer constituting an underlayer in contact with the second layer.

The compound (II) is considered to present excellent performances such as water drop removal property, abrasion resistance, chemical resistance and weather resistance, due to reactivity of said reactive group. Further, it is possible to further improve such performances by selecting an organic group as mentioned hereinafter.

The compound (II) may be used as it is, or may be used as a hydrolyzate. The hydrolyzate of the compound (II) is a compound having e.g. a silanol group, formed by hydrolyzing a part or whole of the reactive groups of the compound (II) in water or in an acidic or alkaline aqueous solution, or a compound having at least two molecules condensed due to reaction of the silanol groups. The acidic aqueous solution may, for example, be an aqueous solution of e.g. hydrochloric acid, acetic acid, sulfuric acid, phosphoric acid, sulfonic acid or methanesulfonic acid.

The compound (II) is preferably a compound represented by the above formula (IIA) and/or (IIB). In the formula (IIA), each of $Z^1$ and $Z^2$ is an isocyanate group or a hydrolyzable group, and a (3-a) number of $Z_1$'s and a (3-b) number of $Z^2$'s may be the same or different. In the formula (IIB), $Z^3$ is an isocyanate group or a hydrolyzable group.

Each of a and b is an integer of from 0 to 2, but is preferably at most 1, more preferably 0, in view of adhesion to the first layer and to the third layer as mentioned hereinafter or the substrate. Likewise, c is an integer of from 1 to 3, preferably 1.

Each of $R^6$ and $R^7$ is hydrogen or a $C_{1-21}$ organic group, and a a number of $R^6$'s and a b number of $R^7$'s may be the same or different. Y is a bivalent organic group. At least one of the group of a a number of $R^6$'s, a b number of $R^7$'s and Y is a fluorine-containing organic group. $R^8$ is hydrogen or a $C_{1-21}$ organic group, provided that a c number of $R^8$'s may be the same or different. At least one of a c number of $R^8$'s is a fluorine-containing organic group.

The fluorine-containing organic group is bonded to the silicon atom preferably by means of a carbon atom having no fluorine atom (such as a carbon atom in a methylene group, an ethylene group or a propylene group).

In a case where Y is a bivalent fluorine-containing organic group, it is preferably a polyfluoroalkylene group, a polyfluorooxaalkylene group (one having at least one ether linkage in the middle of the carbon chain of an alkylene group) or a polyfluorothioxaalkylene group (one having at least one thioether linkage in the middle of the carbon chain in an alkylene group). Particularly preferred is a bivalent organic group having a polymethylene group (particularly dimethylene group) at each terminal which is bonded to the silicon atom, and a perfluoroalkylene group or a perfluorooxaalkylene group at the middle thereof. In this case, the carbon number of Y is preferably from 2 to 30, more preferably from 4 to 16.

In a case where Y is not a bivalent fluorine-containing organic group, preferred is an alkylene group, an oxaalkylene group or a thioxaalkylene group. In this case, the carbon number of Y is preferably from 2 to 30, more preferably from 2 to 12.

In a case where one of a a number of $R^6$'s and a b number of $R^7$'s is a monovalent fluorine-containing organic group, and in a case where one of a c number of $R^8$'s is a monovalent fluorine-containing organic group, said monovalent fluorine-containing organic group is preferably a polyfluoroalkyl group, a polyfluorooxaalkyl group or a polyfluorothioxaalkyl group; or an organic group having one of the above groups and a hydrocarbon group such as an alkylene group bonded by means of an ester linkage, an ether linkage, a thioether linkage, an imino linkage, an amide linkage, a urethane linkage or another linkage (said organic group is bonded to the silicon atom at another terminal of the hydrocarbon group). The polyfluoroalkyl group and the polyfluorooxaalkyl group preferably have a perfluoro moiety and are bonded to the silicon atom by means of an alkylene group (particularly a dimethylene group). The perfluoro moiety in the monovalent organic group is preferably a perfluoroalkyl group, a perfluorooxaalkyl group or a perfluorothioxaalkyl group, having a carbon number of at least 3, particularly preferably a $C_{3-16}$ perfluoroalkyl group.

In a case where an organic group having no fluorine atom is present in the compounds (IIA) and (IIB), said organic group is preferably a hydrocarbon group such as an alkyl group, an alkenyl group, a cycloalkyl group or an aryl group; a halogenated hydrocarbon group such as a chloroalkyl group; a (halogenated) hydrocarbon group having a hydroxyl group, an epoxy group, an amino group, a mercapto group, a carboxyl group or another functional group; or a (halogenated) hydrocarbon group having an ester linkage, an ether linkage, a thioether linkage, an imino linkage, an amide linkage, a urethane linkage or another linkage in the carbon chain. Among them, preferred are a methyl group and a long chain hydrocarbon group. As the long chain hydrocarbon group, preferred is a $C_{4-20}$ alkyl group.

Now, specific examples of the compounds (IIA) and (IIB) will be shown below. In the following formulae, the symbols are as defined above. Further, Rf is a monovalent fluorine-containing organic group, n is an integer of from 2 to 16, and m is an integer of from 1 to 20.

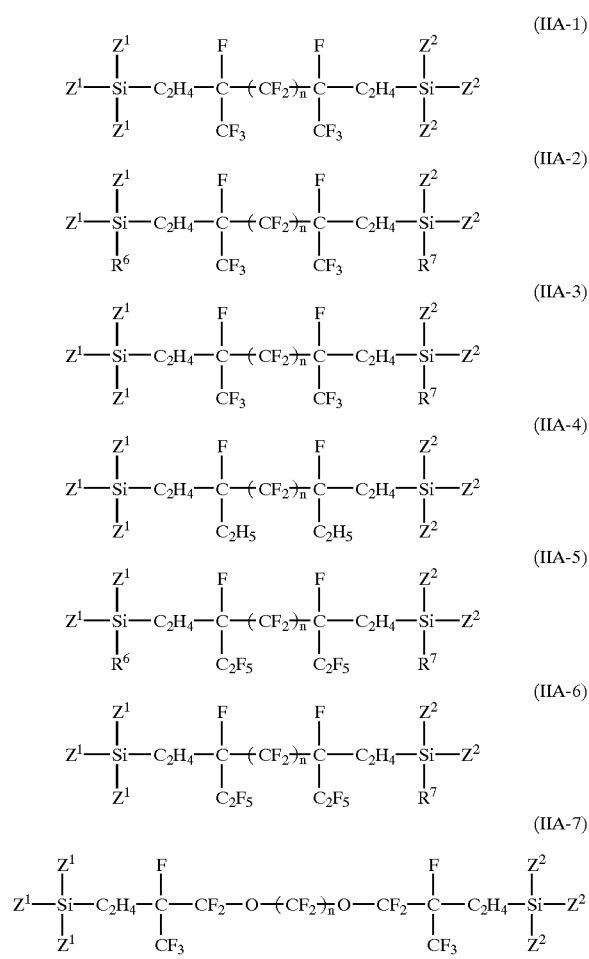

$$Z^1-\underset{R^6}{\underset{|}{Si}}-C_2H_4-\underset{CF_3}{\underset{|}{C}}-CF_2-O-(CF_2)_{\overline{n}}-O-CF_2-\underset{CF_3}{\underset{|}{C}}-C_2H_4-\underset{R^7}{\underset{|}{Si}}-Z^2 \quad (IIA\text{-}8)$$

$$Z^1-\underset{Z^1}{\underset{|}{Si}}-C_2H_4-\underset{CF_3}{\underset{|}{C}}-CF_2-O-(CF_2)_{\overline{n}}-O-CF_2-\underset{CF_3}{\underset{|}{C}}-C_2H_4-\underset{Z^2}{\underset{|}{Si}}-Z^2 \quad (IIA\text{-}9)$$

$$Z^1-\underset{Z^1}{\underset{|}{Si}}-C_2H_4-(CF_2)_{\overline{n}}-C_2H_4-\underset{Z^2}{\underset{|}{Si}}-Z^2 \quad (IIA\text{-}10)$$

$$Z^1-\underset{R^6}{\underset{|}{Si}}-C_2H_4-(CF_2)_{\overline{n}}-C_2H_4-\underset{R^7}{\underset{|}{Si}}-Z^2 \quad (IIA\text{-}11)$$

$$Z^1-\underset{Z^1}{\underset{|}{Si}}-C_2H_4-(CF_2)_{\overline{n}}-C_2H_4-\underset{R^7}{\underset{|}{Si}}-Z^2 \quad (IIA\text{-}12)$$

$$Z^1-\underset{Rf}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{Rf}{\underset{|}{Si}}-Z^2 \quad (IIA\text{-}13)$$

$$Z^1-\underset{R^6}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{R^7}{\underset{|}{Si}}-Z^2 \quad (IIA\text{-}14)$$

$$Z^1-\underset{Rf}{\underset{|}{Si}}-C_2H_4-\underset{C_2F_5}{\underset{|}{C}}-(CF_2)_{\overline{n}}-\underset{C_2F_5}{\underset{|}{C}}-C_2H_4-\underset{Rf}{\underset{|}{Si}}-Z^2 \quad (IIA\text{-}15)$$

$$Z^1-\underset{R^6}{\underset{|}{Si}}-C_2H_4-\underset{C_2F_5}{\underset{|}{C}}-(CF_2)_{\overline{n}}-\underset{C_2F_5}{\underset{|}{C}}-C_2H_4-\underset{R^7}{\underset{|}{Si}}-Z^2 \quad (IIA\text{-}16)$$

$$Z^1-\underset{Z^1}{\underset{|}{Si}}-C_2H_4-\underset{CF_3}{\underset{|}{C}}-CF_2-O-(CF_2)_{\overline{n}}-O-CF_2-\underset{CF_3}{\underset{|}{C}}-C_2H_4-\underset{Z^2}{\underset{|}{Si}}-Z^2 \quad (IIA\text{-}17)$$

$$Z^1-\underset{R^6}{\underset{|}{Si}}-C_2H_4-\underset{CF_3}{\underset{|}{C}}-CF_2-O-(CF_2)_{\overline{n}}-O-CF_2-\underset{CF_3}{\underset{|}{C}}-C_2H_4-\underset{R^7}{\underset{|}{Si}}-Z^2 \quad (IIA\text{-}18)$$

$$Z^1-\underset{Z^1}{\underset{|}{Si}}-C_2H_4-(CF_2)_{\overline{n}}-C_2H_4-\underset{Z^2}{\underset{|}{Si}}-Z^2 \quad (IIA\text{-}19)$$

$$Z^1-\underset{R^6}{\underset{|}{Si}}-C_2H_4-(CF_2)_{\overline{n}}-C_2H_4-\underset{R^7}{\underset{|}{Si}}-Z^2 \quad (IIA\text{-}20)$$

$$Z^1-\underset{Z^1}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{Z^2}{\underset{|}{Si}}-Z^2 \quad (IIA\text{-}21)$$

$$Z^1-\underset{R^6}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{R^7}{\underset{|}{Si}}-Z^2 \quad (IIA\text{-}22)$$

$$Z^1-\underset{Z^1}{\underset{|}{Si}}-C_2H_4-\underset{C_2F_5}{\underset{|}{C}}-(CF_2)_{\overline{n}}-\underset{C_2F_5}{\underset{|}{C}}-C_2H_4-\underset{Rf}{\underset{|}{Si}}-Z^2 \quad (IIA\text{-}23)$$

$$Z^1-\underset{R^6}{\underset{|}{Si}}-C_2H_4-\underset{C_2F_5}{\underset{|}{C}}-(CF_2)_{\overline{n}}-\underset{C_2F_5}{\underset{|}{C}}-C_2H_4-\underset{R^7}{\underset{|}{Si}}-Z^2 \quad (IIA\text{-}24)$$

$$Z^1-\underset{R^6}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{R^7}{\underset{|}{Si}}-Z^2 \quad (IIA\text{-}25)$$

$$Z^1-\underset{Z^1}{\underset{|}{Si}}-C_2H_4-\underset{CF_3}{\underset{|}{C}}-CF_2-O-(CF_2)_{\overline{n}}-O-CF_2-\underset{CF_3}{\underset{|}{C}}-C_2H_4-\underset{Z^2}{\underset{|}{Si}}-Z^2 \quad (IIA\text{-}26)$$

$$Z^1-\underset{R^6}{\underset{|}{Si}}-C_2H_4-\underset{CF_3}{\underset{|}{C}}-CF_2-O-(CF_2)_{\overline{n}}-O-CF_2-\underset{CF_3}{\underset{|}{C}}-C_2H_4-\underset{R^7}{\underset{|}{Si}}-Z^2 \quad (IIA\text{-}27)$$

$$Z^1-\underset{Z^1}{\underset{|}{Si}}-C_2H_4-(CF_2)_{\overline{n}}-C_2H_4-\underset{Z^2}{\underset{|}{Si}}-Z^2 \quad (IIA\text{-}28)$$

$$Z^1-\underset{R^6}{\underset{|}{Si}}-C_2H_4-(CF_2)_{\overline{n}}-C_2H_4-\underset{R^7}{\underset{|}{Si}}-Z^2 \quad (IIA\text{-}29)$$

$$Z^1-\underset{Z^1}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{R^7}{\underset{|}{Si}}-Z^2 \quad (IIA\text{-}30)$$

$$Z^1-\underset{R^6}{\underset{|}{Si}}-C_2H_4-\underset{CF_3}{\underset{|}{C}}-(CF_2)_{\overline{n}}-\underset{CF_3}{\underset{|}{C}}-C_2H_4-\underset{Z^2}{\underset{|}{Si}}-Z^2 \quad (IIA\text{-}31)$$

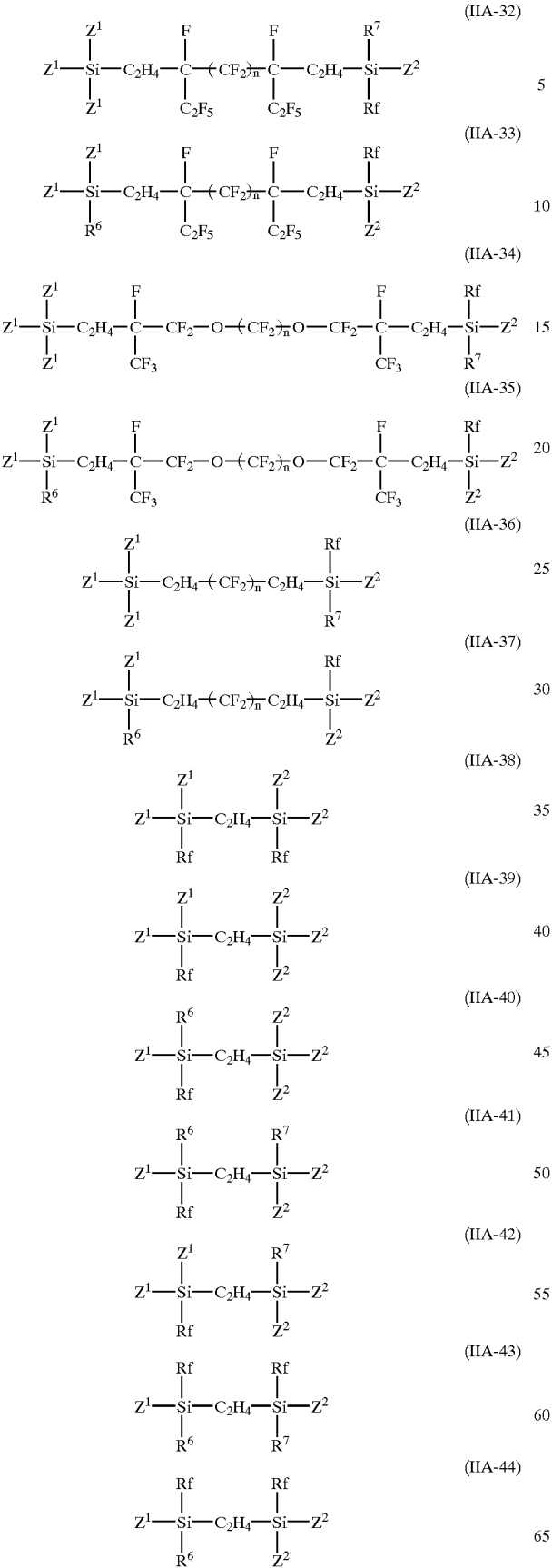
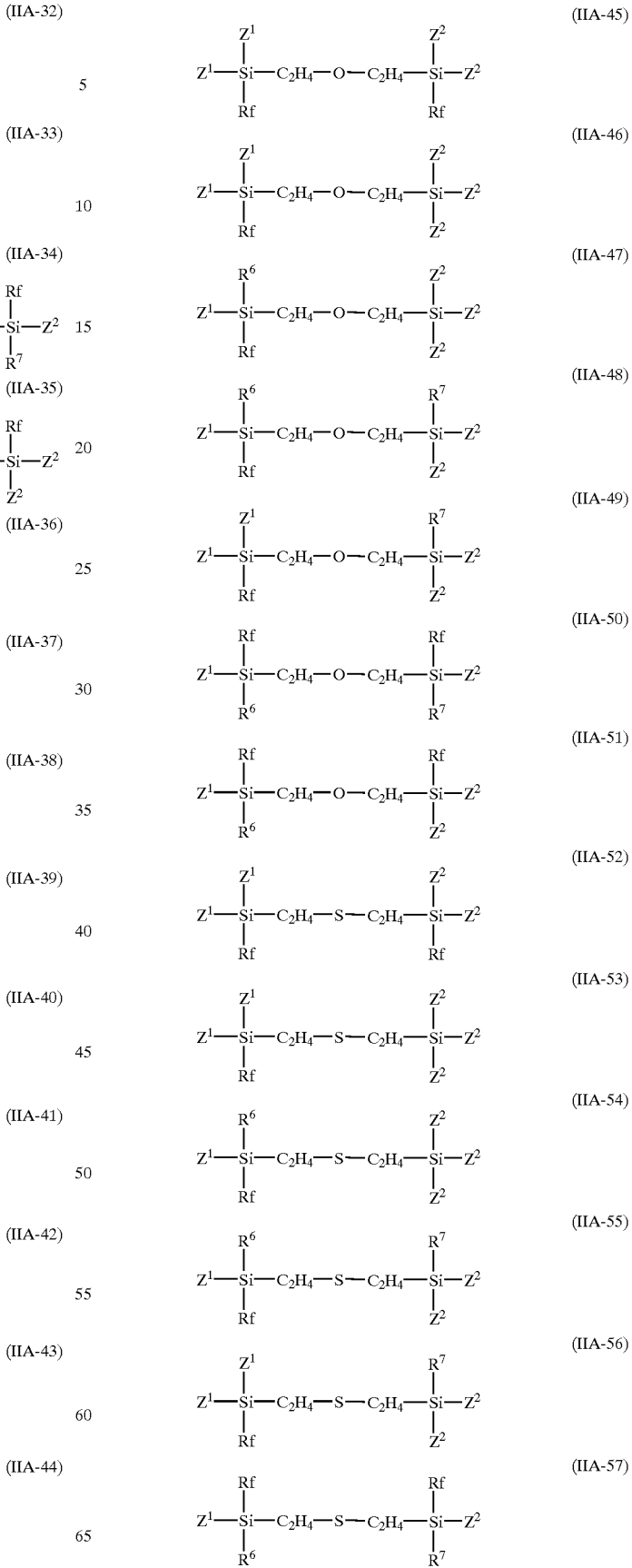

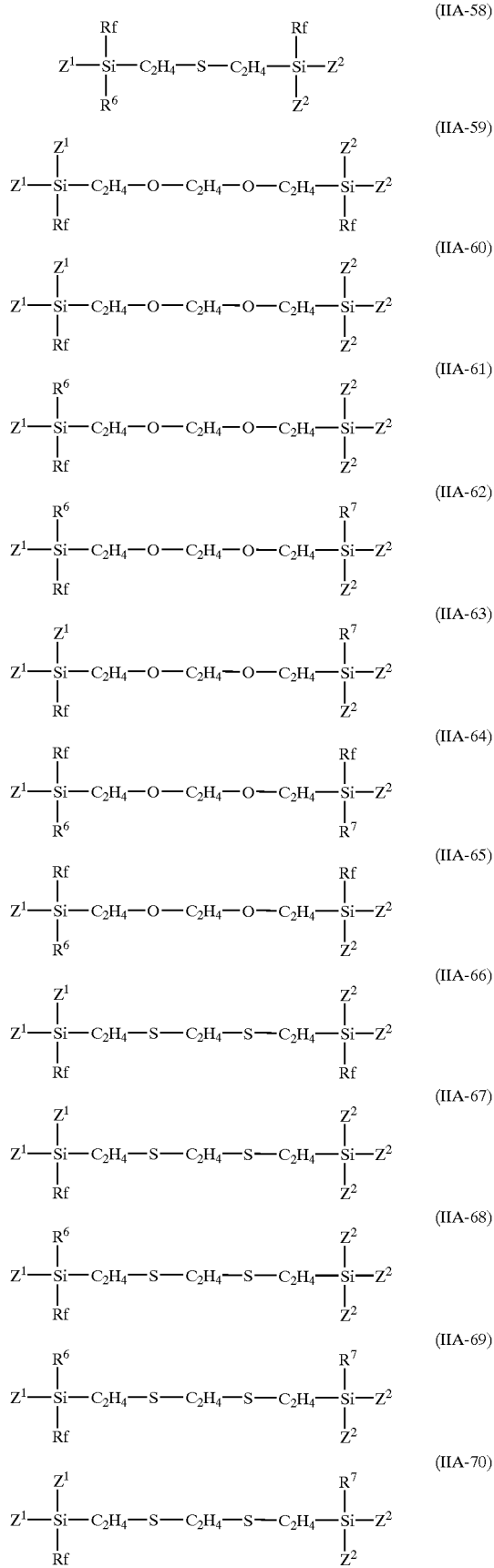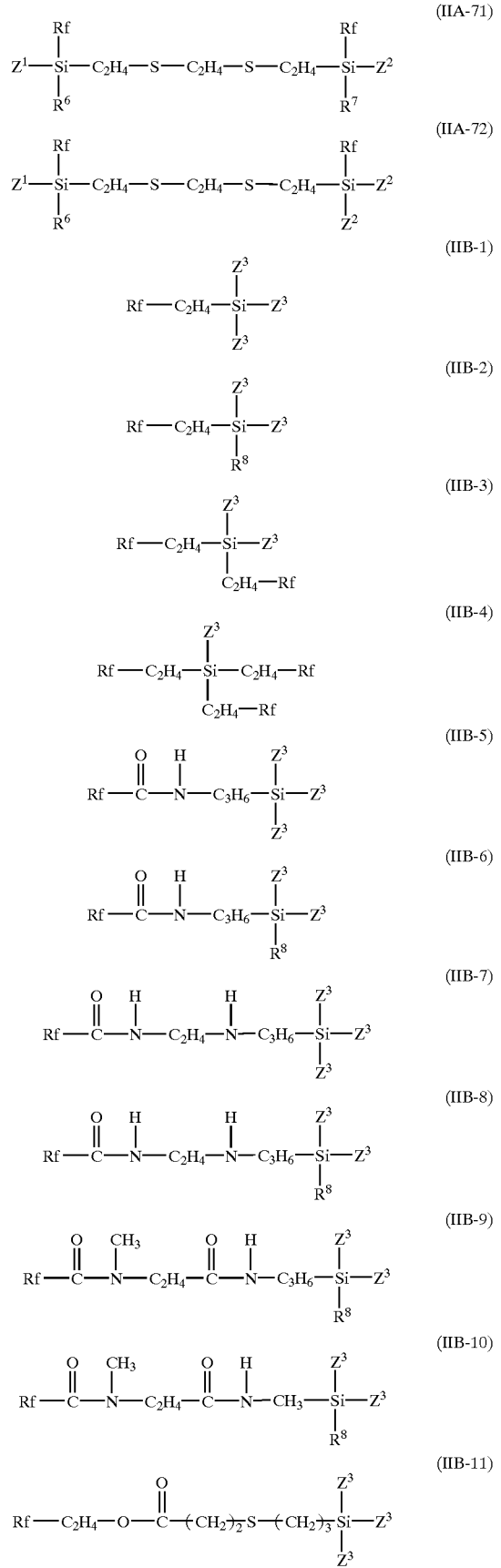

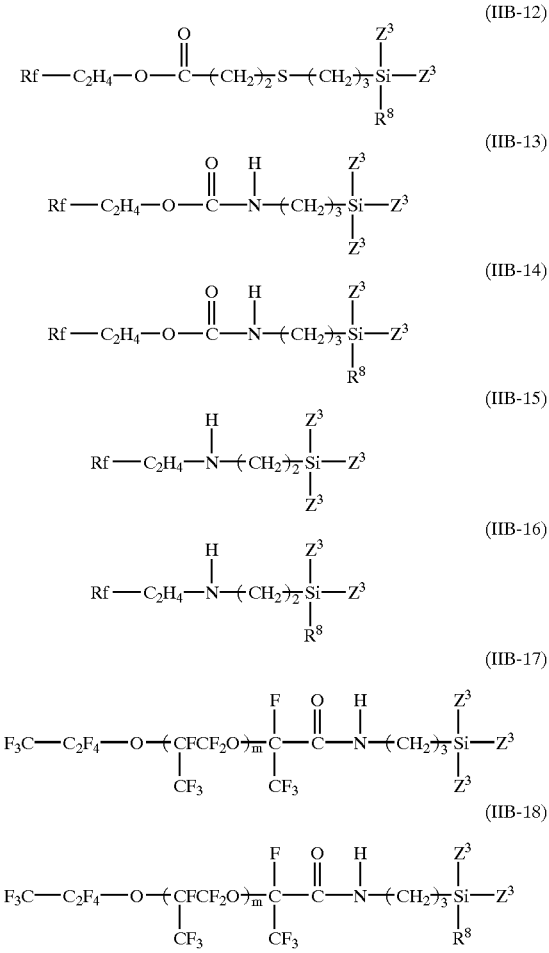

The composition (II) may contain one type of the compound (II), or may contain at least two types of the compounds (II).

The composition (II) may contain another compound or additive, in addition to the above components, depending upon the purpose. The additive etc. may be selected taking the reactivity and compatibility with the other components into consideration. It may, for example, be ultrafine particles of a metal oxide such as silica, alumina, zirconia or titania; or a resin. Further, a water repellent material other than the compound (II), such as a tetrafunctional component such as tetraalkoxysilane or a polydimethylsiloxane compound having both terminals substituted with hydroxyl groups, may, for example, be incorporated with a purpose of e.g. improvement in durability. Further, a dye, a pigment etc. may be incorporated in a case where coloring is required. The amount of the additive etc. may be a level of from 0.01 to 20 parts by weight based on 100 parts by weight of the compound (II), and an excessive addition may decrease the water drop removal property, abrasion resistance etc. of the present invention.

The composition (II) may be used as it is, or may be diluted with an organic solvent as the case requires, taking workability and the desired thickness of the second layer into consideration.

The organic solvent to be used for the composition (II) may, for example, be an acetate, an aromatic hydrocarbon, a halogenated hydrocarbon, a ketone, an ether or an alcohol. However, in a case where the compound (II) has a highly reactive group such as an isocyanate group or a chlorine atom, a solvent having an active proton (a hydrogen atom in e.g. a hydroxyl group) is unfavorable. The organic solvent is not limited to one type, and a solvent mixture of two or more solvents having different polarity, vapor rate etc. may also be used.

The content of the organic solvent in the composition (II) is preferably at most 100,000 parts by weight based on 100 parts by weight of the compound (II). When it is at most 100,000 parts by weight, a uniform coating film is likely to be formed. It is particularly preferably from 1,000 to 10,000 parts by weight based on 100 parts by weight of the compound (II). The content of the organic solvent may optionally be determined taking moldability (workability) of the coating film, the stability, the thickness of the coating film and economical efficiency into consideration.

By covering with the composition (II), the compound (II) contained in the composition (II) is chemically and/or physically bonded to the surface of the third layer or the surface of the substrate. The compound (II) is a compound having at least one isocyanate group or a hydrolyzable group, which is a reactive group in its molecule, and the compound (II) is considered to be bonded to the surface of the third layer or the surface of the substrate mainly by a chemical reaction.

For covering the surface of the third layer or the surface of the substrate with the composition (II), no special pretreatment is required. The formation of the second layer by covering with the composition (II) is carried out in such a manner that the surface is coated with the composition (II) by means of a known method such as brush coating, flow coating, spin coating, dip coating, squeegee coating, spray coating or hand coating, followed by drying in the air or in a stream of nitrogen. The thickness of the second layer to be formed by said surface treatment is not particularly limited, but it is preferably at most 50 nm in view of economical efficiency. Further, the lower limit is a thickness of a monomolecular layer.

The substrate of the present invention has at least the first layer constituting the outermost layer and the second layer constituting an underlayer in contact with the first layer, as mentioned above. Preferably, it further has a third layer constituting an underlayer in contact with the second layer, said third layer being a layer formed by covering with a composition (III) containing a reactive silane compound (III) containing no fluorine.

The reactive silane compound (III) containing no fluorine, as an essential component for the composition (III), is a reactive silane compound which has no fluorine atom.

In the compound (III), its reactive group is directly bonded to the silicon atom. The larger the number of reactive groups directly bonded to the silicon atom per silicon atom, the better. The compound (III) is preferably a compound represented by $SiX_4$ (wherein X is an isocyanate group or a hydrolyzable group, and four X's may be the same or different). Specifically, tetrachlorosilane, tetraisocyanatesilane or tetraalkoxysilane may be mentioned.

Due to reactivity of said reactive group, the compound (III) is strongly bonded mainly to the second layer and the substrate, and contributes to improvement in durability.

Further, the compound (III) may be used as it is, or may be used as a hydrolyzate. The hydrolyzate of the compound (III) is a compound having e.g. a silanol group formed by hydrolyzing a part or whole of the reactive groups of the compound (III) in water or in an acidic or alkaline aqueous solution, or a compound having at least two molecules condensed by the reaction of the silanol groups. The acidic aqueous solution may, for example, be an aqueous solution of e.g. hydrochloric acid, acetic acid, sulfuric acid, phosphoric acid, sulfonic acid or methanesulfonic acid. Further, it is possible to add a metal oxide other than silica or its precursor compound to the compound (III) to obtain a mixed oxide layer or a composite oxide layer as the third layer.

The composition (III) may contain one type of the compound (III), or may contain two or more types of the compounds (III).

The composition (III) may contain another compound or additive, in addition to the above components, depending upon the purpose. The additive etc. may be selected taking reactivity and compatibility with the other components into consideration. As the additive etc., one to be used for the composition (II) may be used in a similar amount.

The composition (III) may be used as it is, but it is preferably diluted with an organic solvent. As the organic solvent, one to be used for the composition (II) may be used.

By covering with the composition (III), the compound (III) contained in the composition (III) is chemically and/or physically bonded to the surface of the substrate. The compound (III) acts to significantly increase durability of the first and second layers, and at the same time, to increase adhesion to the substrate.

For covering the surface of the substrate with the composition (III), no special pre-treatment is required. However, depending upon the purpose, a pre-treatment may be applied. For example, 1) an acid treatment with hydrofluoric acid, sulfuric acid or hydrochloric acid, 2) an alkali treatment with an aqueous sodium hydroxide solution, or 3) a discharge treatment with e.g. plasma irradiation, corona irradiation or electron ray irradiation, may be carried out. Formation of the third layer by covering with the composition (III) is carried out by coating the surface with the composition (III) by means of a known method such as brush coating, flow coating, spin coating, dip coating, squeegee coating, spray coating or hand coating, followed by drying in the air or in a stream of nitrogen. The drying can adequately be conducted at room temperature. When heat drying is applied, the temperature and the time may be set taking the heat resistance of the substrate into consideration. The thickness of the third layer formed by said surface treatment is not particularly limited, and in a case where the substrate is e.g. a soda lime glass, the thickness may be at least 100 nm with a purpose of preventing elution of Na ions. The thickness is preferably at most 500 nm, whereby scratch marks are less likely to outstand even when there are scratches. The thickness is particularly preferably at most 100 nm. Further, the third layer may be extremely thin, and the lower limit is a thickness of a monomolecular layer.

The thickness of each layer to be formed can optionally be controlled by e.g. the concentration of the composition, coating conditions and heating conditions. The thickness of each layer is as mentioned above, but the entire thickness of the treated surface layers is preferably at most 1,000 nm (particularly preferably at most 100 nm) in view of economical efficiency.

In the present invention, the substrate on which the treated surface layers are provided, is not particularly limited. It may, for example, be an inorganic material such as a metal, glass or a ceramic, an organic material such as a plastic, or a combination thereof (such as a composite material or a laminated material). Further, the substrate may be e.g. a metal having a layer of a deposited film, a sputtered film or a film obtained by e.g. a wet method, formed on its surface. For example, one having a coated surface such as a coated metal plate, or one having a treated surface layer such as a surface-treated glass, may be mentioned. Among them, a substrate made of a transparent material such as glass or a plastic, tends to present a remarkable effect of the present invention.

The shape of the substrate on which the treated surface layers are provided, is not limited to a flat plate. It may have an optional shape depending upon the particular purpose, such as one having a curvature over the entire surface or at a part thereof.

Now, the process for producing the substrate having treated surface layers of the present invention will be explained below.

The process for producing the substrate having treated surface layers of the present invention is not particularly limited. However, as a preferred production process, a process comprising a step of covering the surface of the substrate with the above composition (II) to form the second layer, and a step of covering the surface of the second layer with the above composition (I) to form the first layer, may be mentioned.

The step of covering with the above composition (II) to form the second layer and the step of covering the surface of the second layer with the above composition (I) to form the first layer are carried out as described in explanation of the compositions (I) and (II).

The above production process preferably comprises a drying step after the first layer is formed. The drying step may be carried out at room temperature, or heating may be carried out at a temperature of from 80 to 300° C. for from 1 to 60 minutes. Drying at room temperature or drying by heating is selected depending upon e.g. purpose. The drying at room temperature is economically favorable as no special equipment has to be introduced. Particularly in a case where the object to be treated is incorporated into another article (e.g. a glass substrate mounted on an automobile), it is practically difficult to apply drying by heating, and the drying at room temperature is thereby selected. On the other hand, the drying by heating is favorable, since the drying rate tends to be high, and excellent durability tends to be obtained.

Further, in a case where the substrate of the present invention has a third layer constituting an underlayer in contact with the second layer, preferred is a production process which comprises a step of covering the surface of the substrate with the above composition (III) to form the third layer, a step of covering the surface of the third layer with the above composition (II) to form the second layer, and a step of covering the surface of the second layer with the above composition (I) to form the first layer.

The step of covering the surface of the substrate with the above composition (III) to form the third layer is carried out as described in the explanation of the composition (III). The step of covering with the above composition (II) to form the second layer and the step of covering the surface of the second layer with the above composition (I) to form the first layer are the same as in the case where the substrate has no third layer.

The above production process preferably comprises a heating step after the first layer is formed. The heating is carried out, for example, in the air at a temperature of from 80 to 250° C. for from 5 to 60 minutes.

Further, a heating step may be carried out after the third layer is formed and before the second layer is formed. In such a case, heating is carried out, for example, at a temperature of at least 400° C., preferably from 500 to 700° C., for from 1 to 60 minutes. By heating, adhesion between the third layer and the substrate and density of the third layer will increase, and the durability will increase.

The substrate of the present invention is a substrate having at least two treated surface layers. Basically, the first layer formed by covering with the above composition (I) contributes to appearance of excellent water drop rolling property, the second layer formed by covering with the above composition (II) contributes to appearance of excellent water repellency, and the third layer formed by covering with the above composition (III) as the case requires, acts to strongly bond mainly the second layer to e.g. the substrate.

The effect of the present invention exceeds the effect expected in a case where materials having different functions are merely laminated. As mentioned above, the first layer formed by covering with the composition (I) is a silicone type coating film, and the second layer formed by covering with the composition (II) is a fluorine-containing silicone coating film. It is very difficult to coat the fluorine-containing silicone coating film having a low surface energy with a silicone coating film having a high surface energy, with conventional technique.

However, according to the present invention employing the constitution of the materials as mentioned above, such a coating becomes possible. The mechanism is not clear in detail, but it is considered that there is a strong interaction between molecules which can not conventionally be expected, between the material constituting the first layer and the material constituting the second layer, with a combination of selected materials for the compositions of the present invention. Part of the interaction is estimated to be mixing (interdiffusion) between the material constituting the first layer and the material constituting the second layer. In a case where the surface of the second layer is covered with the composition (I) as in the present invention, the contact angle of the surface of the first layer to water is high as compared with a case where the surface of a glass is directly covered with the composition (I), for example. This is considered to be because the fluorine-containing reactive silane compound (II) in the material constituting the second layer having a large contact angle is diffused through the first layer in a process of forming the first layer, and a part thereof is exposed to the surface of the first layer.

Further, the first layer alone does not show a very high durable water repellency, but it shows an extremely high durability when coated on the surface of the second layer, and it is thereby considered that there is a synergistic effect which can not be expected with conventional technique, between the first layer and the second layer.

Namely, the concept of the layers in the present invention is such that the layers can be distinguished macroscopically, but microscopically, the border lines can not be strictly drawn, and a part or whole of the layers are mutually mixed with each other at the interface therebetween. In the present invention, due to such a layer structure, with respect to the water drop rolling property and durable water repellency depending on the material constituting the surface of the first layer, not only water drop rolling property derived from the composition (I) as the material constituting the first layer but also durable water repellency derived from the fluorine-containing reactive silane compound (II) as the material constituting the second layer is excellent.

As mentioned above, a water repellency agent intended to obtain surface characteristics of both a fluorine-containing silicone material and a silicone type material by mixing them, has conventionally been proposed. However, the fluorine-containing silicone material having a low surface energy tends to move outside the silicone type material having a high surface energy, and no desired water drop rolling property derived from the latter could be obtained.

In the present invention, a substrate which is excellent in both water drop rolling property and durable water repellency, and which is excellent in water drop removal property, is realized by using the above compositions (I) and (II) as materials constituting the first and second layers, respectively, preferably by employing a predetermined production process.

The application of the substrate of the present invention is not particularly limited, but it is particularly useful for articles for transportation equipments and articles for buildings or building decorations.

The articles for transportation equipments include window glasses (such as a windshield, a side glass and a rear glass), mirrors, display surface materials, instrument panels and other components (such as bodies and bumpers) in transportation equipments such as electronic cars, buses, trucks, automobiles, ships or aircrafts.

Such an article for a transportation equipment may be composed solely of the substrate of the present invention or may have the substrate incorporated therein. For example, the former may be a window glass for an automobile, and the latter may be a back mirror component for an automobile in which a glass mirror is incorporated.

With such substrates or articles, water drops on the surface will be repelled due to water drop removal property of the present invention. Especially, during driving of a transportation equipment, due to the interaction with the receiving wind pressure, water drops rapidly move on the surface and will not remain as water drops, whereby any adverse effect which may otherwise be induced by moisture, can be eliminated.

Especially in the application to a see-through portion such as a window glass, it becomes easy to secure a field of view due to dissipation of water drops. Namely, the substrate of the present invention is excellent in not only water drop rolling property but also water repellency, and e.g. raindrops attached to the surface will roll down as water drops, differently from a surface having water drop rolling property but being poor in water repellency, water attached to which will roll down in a form of a film. Accordingly, it becomes easy to secure a field of view.

The articles for buildings or building decorations may be articles to be attached to buildings or articles already attached to buildings, or articles for buildings which are not attached to buildings but which are used for buildings, articles for buildings such as furnitures or equipments, or substrates as components for such articles.

Specific examples of the articles for buildings or building decorations include window glass plates (window glasses); glass plates for roofs and various roofs including glass roofs; glass plates for doors or doors having such glass plates installed; glass plates for partitions; glass plates for green houses or green houses having such glass plates, transparent plastic plates to be used instead of glasses or the above articles for buildings (such as window materials and roof materials) having such plastic plates; wall materials made of ceramics, cement, metals or other materials; mirrors or furnitures having such mirrors; and glass for display shelves or show cases.

Such an article for buildings or building decorations may be made of the substrate of the present invention alone or may be one having the substrate incorporated therein. For example, the former may be a window glass plate, and the latter may be a furniture in which a glass mirror is incorporated.

With such a substrate, water drops which are brought in contact with the surface are repelled due to the water drop removal property and scarcely attach to the surface, or if attached, the amount is small and the attached water drops can easily be removed.

Further, the substrate of the present invention is excellent in not only initial water drop rolling property and water repellency but also abrasion resistance, weather resistance and boilproof resistance, due to the combination of the above first and second layers. Further, it is excellent also in chemical resistance, whereby it can be used at a region along the coastline or at a region where sea water is directly in contact.

When the substrate of the present invention has the third layer, the durability tends to be excellent. For example, when it is used for a windshield for an automobile, its performances can be maintained for from 3 to 5 years without separation or falling off of the first layer and the second layer.

In a case where the substrate of the present invention has no third layer, there is such an advantage that the first and second layers can easily be separated to newly form first and second layers on the occasion of repair.

Further, as the substrate is excellent in water repellency, in an environment where water drops usually freeze, no freezing of water drops takes place on the surface, or even if slight freezing takes place, the frozen drops can readily be defrosted. Further, there will be no substantial deposition of water drops, whereby the number of periodical cleaning operations can be reduced. Besides, the cleaning operation is very easy, such being advantageous also for the protection of good appearance.

Now, the present invention will be explained in further detail with reference to Examples and Comparative Examples. However, it should be understood that the present invention is by no means restricted to such specific Examples.

1. PREPARATION OF SUBSTRATES HAVING TREATED SURFACE LAYERS

EXAMPLE 1

Into a glass container equipped with a stirrer and a thermometer, 3.0 g of $Si(NCO)_4$ and 97.0 g of n-butyl acetate were introduced, followed by stirring at 25° C. for 10 minutes to prepare a treating agent 1-3.

Into another glass container equipped with a stirrer and a thermometer, 3.0 g of $C_8F_{17}C_2H_4SiCl_3$ (molecular weight 581.5, fluorine content (F content) 56%, a compound which forms a surface having a contact angle of 113° to water) and 97.0 g of ethyl acetate were introduced, followed by stirring at 25° C. for 10 minutes to prepare a treating agent 1-2.

Further, into another glass container equipped with a stirrer and a thermometer, 10.0 g of a compound 1 represented by the following formula (2) (molecular weight 922, F content 35%, a compound which forms a surface having a rolling angle of 7° to water and a contact angle of 103° to water) and 90.0 g of ethyl acetate were introduced, followed by stirring at 25° C. for 10 minutes to prepare a treating agent 1-1.

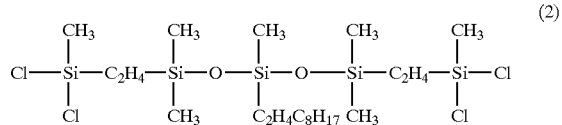

(2)

Then, 0.5 ml of the treating agent 1-3 was dropped on a glass substrate (10 cm×10 cm×3 mm in thickness) which was preliminarily cleaned, and spread with a cloth. The glass plate was left to stand at room temperature for 1 minute, and then 0.5 ml of the treating agent 1-2 was dropped on the layer formed by covering with the treating agent 1-3, and spread with a cloth. The substrate was left to stand at room temperature for 1 minute, and then 0.5 ml of the treating agent 1-1 was dropped on the layer formed by covering with the treating agent 1-2, and spread with a cloth. The substrate thus obtained was left to stand for one day at room temperature to obtain a substrate 1.

Here, in the substrate 1, [molecular weight of the compound (I)]/[molecular weight of the compound (II)]=1.59, and [fluorine content in the compound (I)]/[the fluorine content in the compound (II)]=0.63. Further, the layer formed by coating with the treating agent 1-3, followed by drying, had a thickness of 16 nm as measured by a stylus method. The thicknesses of the layers formed by coating with the treating agent 1-2 and the treating agent 1-1 were estimated to be 6 nm and 8 nm, respectively, as measured by ESCA. Accordingly, the entire thickness was 30 nm.

EXAMPLE 2

A substrate 2 was obtained in the same manner as in Example 1 except that the substrate was heated at 200° C. for 30 minutes instead of being left to stand at room temperature for one day.

EXAMPLE 3

A substrate 3 was obtained in the same manner as in Example 1 except that the substrate was heated at 650° C. for 7 minutes and then cooled to room temperature, instead of being left to stand at room temperature for 1 minute between the covering with the treating agent 1-3 and the covering with the treating agent 1-2.

EXAMPLE 4

Into a glass container equipped with a stirrer and a thermometer, 3.0 g of $C_8F_{17}C_2H_4Si(OCH_3)_3$ (molecular weight 568, F content 57%, a compound which forms a surface having a contact angle of 110° to water) and 97.0 g of isopropyl alcohol were introduced, followed by stirring at 25° C. for 10 minutes, and 2.6 g of a 0.1 mol/l aqueous nitric acid solution was dropwise added thereto, followed by stirring at 25° C. for 3 days, to prepare a treating agent 4-2. A substrate 4 was obtained in the same manner as in Example 1 except that the treating agent 4-2 was used instead of the treating agent 1-2.

Here, in the substrate 4, [molecular weight of the compound (I)]/[molecular weight of the compound (II)]=1.62, and [fluorine content in the compound (I)]/[the fluorine content in the compound (II)]=0.61.

EXAMPLE 5

Into a glass container equipped with a stirrer and a thermometer, 3.0 g of $C_8F_{17}C_2H_4Si(NCO)_3$ (molecular weight 601, F content 54%, a compound which forms a surface having a contact angle of 111° to water) and 97.0 g of ethyl acetate were introduced, followed by stirring at 25° C. for 10 minutes to prepare a treating agent 5-2. A substrate 5 was obtained in the same manner as in Example 1 except that the treating agent 5-2 was used instead of the treating agent 1-2.

Here, in the substrate 5, [molecular weight of the compound (I)]/[molecular weight of the compound (II)]=1.53, and [fluorine content in the compound (I)]/[the fluorine content in the compound (II)]=0.65.

EXAMPLE 6

Into a glass container equipped with a stirrer and a thermometer, 3.0 g of $C_8F_{17}C_2H_4SiCl_3$, 0.6 g of a compound 2 represented by the following formula (3) (molecular weight 2,389, F content 0%, a compound which forms a surface having a contact angle of 104° to water) and 97.0 g of ethyl acetate were introduced, followed by stirring at 25° C. for 10 minutes to prepare a treating agent 6-2. A substrate 6 was obtained in the same manner as in Example 1 except that the treating agent 6-2 was used instead of the treating agent 1-2.

Here, the mixture of 3.0 g of $C_8F_{17}C_2H_4SiCl_3$ and 0.6 g of the compound 2 is one which forms a surface having a contact angle of 109° to water.

Further, of the mixture of 3.0 g of $C_8F_{17}C_2H_4SiCl_3$ and 0.6 g of the compound 2, the number average molecular weight is 665, and the average F content is 46%. Accordingly, in the substrate 6, [molecular weight of the compound (I)]/[molecular weight of the compound (II)]= 1.39, and [fluorine content in the compound (I)]/[the fluorine content in the compound (II)]=0.76.

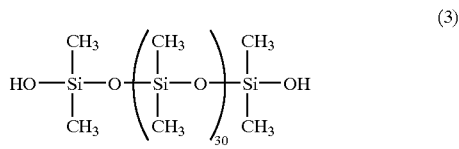

(3)

EXAMPLE 7

Into a glass container equipped with a stirrer and a thermometer, 10.0 g of a compound 3 represented by the following formula (4) (molecular weight 6,409, F content 27%, a compound which forms a surface having a rolling angle of 13° to water and a contact angle of 102° to water) and 90.0 g of ethyl acetate were introduced, followed by stirring at 25° C. for 10 minutes to prepare a treating agent 7-1. A substrate 7 was obtained in the same manner as in Example 1 except that the treating agent 7-1 was used instead of the treating agent 1-1.

Here, in the substrate 7, [molecular weight of the compound (I)]/[molecular weight of the compound (II)]=11.0, and [fluorine content in the compound (I)]/[the fluorine content in the compound (II)]=0.48.

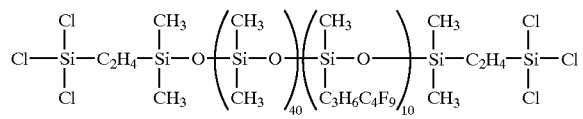

(4)

EXAMPLE 8

Into a glass container equipped with a stirrer and a thermometer, 3.0 g of $Si(OC_2H_5)_4$ and 97.0 g of isopropyl alcohol were introduced, followed by stirring at 25° C. for 10 minutes, and 3.0 g of a 0.1 mol/l aqueous nitric acid solution was dropwise added thereto, followed by stirring at 25° C. for one day, to prepare a treating agent 8-3. A substrate 8 was obtained in the same manner as in Example 1 except that the treating agent 8-3 was used instead of the treating agent 1-3.

EXAMPLE 9

A substrate 9 was obtained in the same manner as in Example 3 except that the treating agent 8-3 was used instead of the treating agent 1-3.

EXAMPLE 10

Into a glass container equipped with a stirrer and a thermometer, 3.0 g of $Si(OC_2H_5)_4$, 0.3 g of $Sn(OC_4H_9)_4$ and 97.0 g of isopropyl alcohol were introduced, followed by stirring at 25° C. for 10 minutes, and 3.0 g of a 0.1 mol/l aqueous nitric acid solution was dropwise added thereto, followed by stirring at 25° C. for one day, to prepare a treating agent 10-3. A substrate 10 was obtained in the same manner as in Example 3 except that the treating agent 10-3 was used instead of the treating agent 1-3.

EXAMPLE 11

0.5 ml of the treating agent 1-2 obtained in Example 1 was dropped on a glass substrate (10 cm×10 cm×3 mm in thickness) which was preliminarily cleaned, and spread with a cloth. The substrate was left to stand for 1 minute at room temperature, and then 0.5 ml of the treating agent 1-1 obtained in Example 1 was dropped on the layer formed by covering with the treating agent 1-2, and spread with a cloth. The substrate was left to stand for one day at room temperature to obtain a substrate 11.

Comparative Example 1

Into a glass container equipped with a stirrer and a thermometer, 1.5 g of $C_8F_{17}C_2H_4SiCl_3$ (a compound which forms a surface having a rolling angle of 22° to water), 1.5 g of the compound 1 of the above formula (2) (a compound which forms a surface having a rolling angle of 7° to water) and 97.0 g of ethyl acetate were introduced, followed by stirring at 25° C. for 10 minutes to prepare a treating agent R1.

0.5 ml of the treating agent 1-3 (containing a compound which forms a surface having a contact angle of 8° to water) obtained in Example 1 was dropped on a glass substrate (10 cm×10 cm×3 mm in thickness) which was preliminarily cleaned, and spread with a cloth. The substrate was left to stand for 1 minute at room temperature, and then 0.5 ml of the treating agent R1 was dropped on the layer formed by covering with the treating agent 1-3, and spread with a cloth. The substrate was left to stand for one day at room temperature to obtain a substrate R1.

Comparative Example 2

0.5 ml of the treating agent 1-3 obtained in Example 1 was dropped on a glass substrate (10 cm×10 cm×3 mm in thickness) which was preliminarily cleaned, and spread with a cloth. The substrate was left to stand for 1 minute at room temperature, and then 0.5 ml of the treating agent 1-1 (containing a compound which forms a surface having a rolling angle of 7° to water) obtained in Example 1 was dropped on the layer formed by covering with the treating agent 1-3, and spread with a cloth. The substrate was left to stand for one day at room temperature to obtain a substrate R2.

Comparative Example 3

0.5 ml of the treating agent 1-3 obtained in Example 1 was dropped on a glass substrate (10 cm×10 cm×3 mm in thickness) which was preliminarily cleaned, and spread with a cloth. The substrate was left to stand at room temperature for 1 minute, and then 0.5 ml of the treating agent 1-2 (containing a compound which forms a surface having a rolling angle of 22° to water) obtained in Example 1 was dropped on the layer formed by covering with the treating agent 1-3, and spread with a cloth. The substrate was left to stand at room temperature for one day, to obtain a substrate R3.

2. EVALUATION OF WATER DROP REMOVAL PROPERTY AND WATER REPELLENCY

With respect to the surface of each substrate obtained, the water drop removal property and the water repellency were evaluated by means of the rolling angle and the contact angle, respectively. The measuring methods are shown below.

(a) Rolling Angel

On the surface of a substrate sample which was held horizontally, 50 μl of water drops were dropped, and one side of the substrate was lifted up and gradually inclined. The angle between the substrate surface and a horizontal plane at which the water drops started to roll was read. Accordingly, the smaller the angle, the more excellent the water drop removal property of the sample. Practically, the initial rolling angle is preferably at most 20°, particularly preferably at most 10°.

(b) Contact Angle

Using water drops having a diameter of 1 mm, the contact angle on the surface of a substrate sample was measured. Measurement was carried out with respect to five different points on the substrate surface, and the average was calculated. Practically, the initial contact angle is preferably at least 90°, particularly preferably at least 100°.

The abrasion resistance, weather resistance and boilproof property of the substrates were evaluated by measuring the rolling angle and the contact angle according to the above methods, after each of the following treatments was carried out.

(1) Abrasion Resistance

Using a reciprocating traverse testing machine (manufactured by KNT), an abrasion treatment was carried out under the following testing conditions.

Testing conditions: a flannel cloth, 1 kg load, 3,000 reciprocations (2) Weather Resistance A treatment of 200 cycles, one cycle comprising irradiation with ultraviolet light at 70° C. for 8 hours and exposure to a moist air at 50° C. for 4 hours, was carried out.

(3) Boilproof Property

A boiling test of immersing the substrate in a boiling water for 3 hours, was carried out.

The initial performances of the substrates, and the abrasion resistance, weather resistance and boilproof property, are shown in Table 1.

TABLE 1

| Substrate | Initial performance | | Abrasion resistance | | Weather resistance | | Boilproof property | |
|---|---|---|---|---|---|---|---|---|
| | Rolling angle | Contact angle | Rolling angle | Contact angle | Rolling angle | Contact angle | Rolling angle | Contact angle |
| 1 | 6° | 108° | 10° | 104° | 18° | 98° | 13° | 104° |
| 2 | 8° | 109° | 9° | 105° | 17° | 100° | 13° | 105° |
| 3 | 6° | 106° | 8° | 105° | 17° | 102° | 8° | 106° |
| 4 | 6° | 108° | 9° | 104° | 21° | 98° | 14° | 105° |
| 5 | 7° | 108° | 10° | 104° | 21° | 98° | 10° | 103° |
| 6 | 5° | 107° | 9° | 105° | 18° | 102° | 13° | 105° |
| 7 | 12° | 107° | 15° | 103° | 20° | 100° | 14° | 103° |
| 8 | 11° | 107° | 16° | 103° | 19° | 99° | 13° | 104° |
| 9 | 13° | 106° | 15° | 103° | 17° | 100° | 14° | 105° |
| 10 | 9° | 107° | 12° | 104° | 19° | 102° | 13° | 105° |
| 11 | 8° | 106° | 15° | 101° | 28° | 90° | 23° | 92° |
| R 1 | 15° | 107° | 22° | 101° | 32° | 88° | 30° | 90° |
| R 2 | 9° | 102° | 13° | 95° | 34° | 68° | 33° | 79° |
| R 3 | 22° | 112° | 24° | 108° | 42° | 88° | 35° | 104° |

The substrates of the present invention (substrates 1 to 11 obtained in Examples 1 to 11) are excellent in the initial water drop rolling property and water repellency, and excellent in all of the abrasion resistance, weather resistance and boilproof property.

On the other hand, the substrate obtained by a treatment with the treating agent obtained by merely mixing the compound (I) and compound (II) (substrate R1 obtained in Comparative Example 1) is excellent in the initial water repellency, but is poor in water drop rolling property, and is poor in all of the abrasion resistance, the weather resistance and boilproof property.

Further, the substrate having no second layer which is a layer formed by covering with the composition (II) containing a predetermined fluorine-containing reactive silane compound (II) (substrate R2 obtained in Comparative Example 2) is excellent in the initial water drop rolling property, but is slightly poor in water repellency, and poor in all of the abrasion resistance, weather resistance and boilproof property. Further, the substrate having no first layer which is a layer formed by covering with the above composition (I) (substrate R3 obtained in Comparative Example 3) is excellent in the initial water repellency, but is poor in the initial water drop rolling property, and all of the abrasion resistance, weather resistance and boilproof property.

Accordingly, it is evident that the above effects of the present invention are realized by a constitution having the above first layer constituting the outermost layer and the second layer constituting an underlayer in contact with the first layer.

(4) Chemical Resistance

The chemical resistance of the substrates was evaluated in such a manner that the substrates 1 and 6 obtained in Examples 1 and 6 were soaked in each of the chemicals as identified in Table 2 for 24 hours, and they were washed immediately after they were taken out, whereupon the change in appearance was observed, and the rolling angle and the contact angle were measured. The results of evaluating the chemical resistance of the substrates are shown in Table 2.

TABLE 2

| Substrate | Chemical | Chemical resistance | | |
|---|---|---|---|---|
| | | Change in appearance | Rolling angle (°) | Contact angle (°) |
| 1 | Before treatment | — | 6 | 108 |
| | Methanol | No change | 8 | 106 |
| | Acetone | No change | 9 | 106 |
| | Gasoline | No change | 8 | 106 |
| | 1% Aqueous sulfuric acid solution | No change | 10 | 105 |
| | 1% Aqueous NaOH solution | No change | 10 | 104 |
| 6 | Before treatment | — | 5 | 107 |
| | Methanol | No change | 7 | 105 |
| | Acetone | No change | 8 | 104 |
| | Gasoline | No change | 8 | 107 |
| | 1% Aqueous sulfuric acid solution | No change | 9 | 106 |
| | 1% Aqueous NaOH solution | No change | 9 | 106 |

The substrates of the present invention (substrates 1 and 6) underwent substantially no deterioration in the water drop rolling property and the water repellency by soaking in chemicals, and are excellent in chemical resistance.

3. FIELD-APPLICATION TEST 1

Test Example 1

The surface of a laminated windshield for an automobile was covered in the same manner as in Example 1, and the obtained laminated windshield was mounted on the front of an automobile so that the treated surface faced outside. This automobile was subjected to a running test of 4 hours per day for 1 month, whereby deposition of soil or dust on the surface of the windshield was visually observed everyday, and deposition of water drops was visually observed when it rained.

As a result, no deposition of soil or dust and no formation of fur due to deposition of water drops was observed, and even when observed, such deposition or formation was readily removed by gentle wiping with a tissue paper. Further, at the time of raining, water drops on the surface were repelled and readily moved away by an interaction with wind pressure by running, whereby the field of view was secured without using a wiper.

Test Example 2

A test was carried out in the same manner as in Test Example 1, except that a running test was carried out under an environment (0° C. to −5° C.) under which water drops deposited on a non-treated laminated windshield would freeze or under which moisture in the air would condense and frost on a windshield, instead of the running test of 4 hours per day. Further, the automobile was tested by a running test under a severer low temperature environment (−10° C. to −15° C.).

In the running test at from 0° C. to −5° C., no freezing or frosting on the windshield was observed. Further, in the running test at from −10 to −15° C., frosting was observed on the windshield, but the defrosting rate was significantly high as compared with a non-treated windshield, when the temperature was recovered to room temperature.

Test Example 3

Running tests were carried out in the same manner as in Test Examples 1 and 2 except that the laminated windshield was changed to a side glass or a rear glass. As a result, the same effects as in Test Examples 1 and 2 were confirmed on each of the side glass and the rear glass.

4. PREPARATION OF A SUBSTRATE OF THE PRESENT INVENTION BY COVERING A LAMINATED WINDSHIELD FOR AN AUTOMOBILE MOUNTED ON THE FRONT OF AN AUTOMOBILE

Test Example 4

On the entire surface of a laminated windshield of an automobile used for 5 years, a suspension having calcium carbonate suspended in water was dropped, and the surface was polished with a sponge in a manner similar to waxing an automobile. After the polishing, water was fully spread on the surface to confirm that the surface was thoroughly polished so that no area on the surface repelled water, and the substrate was dried for 1 hour. After the drying, the laminated windshield was subjected to a treatment in the same manner as in Example 1, to prepare a substrate of the present invention mounted on the front of an automobile. This automobile was subjected to running tests in the same manner as in Test Examples 1 and 2. As a result, the same effects as in Test Examples 1 and 2 were confirmed.

Further, the same operation as mentioned above was carried out except that the treatment was carried out in the same manner as in Example 11 instead of Example 1, whereupon the treatment was carried out more easily, and the same effects as in the above Example were confirmed.

5. FIELD-APPLICATION TEST 2

Test Example 5

The surface of a window glass for building was treated in the same manner as in Example 1, and the window glass thus obtained was attached to a house so that the treated surface faced outside. Deposition of soil and dust on the surface of this window glass as well as deposition of water drops when it rained, were visually observed.

As a result, no deposition of soil or dust, or no formation of fur due to deposition of water drops was observed, and if observed, such deposition or formation was readily removed by gentle wiping with tissue paper. Further, at the time of raining, water drops on the surface were repelled and fell off, and especially when a strong wind blew, water drops were readily moved away by the interaction with the window pressure, whereby the filed of view was secured.

Test Example 6

The same operation as in Test Example 5 was carried out except that the test was carried out under an environment (0° C. to −5° C.) under which water drops deposited on a non-treated window glass would freeze, or moisture in the air would condense and frost on a window glass, instead of the above test under normal weather condition. Further, a test was carried out under a severer low temperature environment (−10° C. to −15° C.).

In the test at from 0 to −5° C., no freezing or frosting on the window glass was observed. Further, in the test at from −10 to −15° C., frosting was observed on the window glass, but the defrosting rate was significantly high as compared with a non-treated window glass, when the temperature was recovered to room temperature.

The substrate of the present invention is excellent in water drop rolling property and water repellency (i.e. water drop removal property) on its surface, and is excellent in abrasion resistance, weather resistance and boilproof property, and accordingly the water drop removal property will be maintained for a long period of time. The substrate is excellent also in chemical resistance, whereby it can be widely applied.

Further, to produce the substrate of the present invention, no special pre-treatment is required on a substrate before treatment, such being favorable in view of economical efficiency. Particularly, the water drop removal property will last for a long period of time even with a treatment at room temperature.

Accordingly, the application of the substrate of the present invention is not particular limited, and it can be used widely, and it is particularly suitable for the field of transportation equipments and the field of buildings or building decorations.

What is claimed is:

1. A substrate having at least three layers, wherein the first layer is an outermost layer formed by covering said substrate with a composition comprising a reactive silicon-containing compound (I) capable of forming a surface having a rolling angle of at most 30° to water, and a second layer in contact with said first layer is formed by covering said substrate with a composition (II) comprising a fluorine-containing reactive silane compound (II) capable of forming a surface having a contact angle of at least 100° to water, and a third layer in contact with said second layer is formed by covering said substrate with a composition comprising a reactive silane compound (III) comprising no fluorine.

2. The substrate according to claim 1, wherein both the compounds (I) and (II) comprise one or more fluorine atoms and satisfy the relation of (fluorine content in the compound (I))/(fluorine content in the compound (II))<1.0, where the fluorine content (%) is defined as (the number of F atoms in a compound)×(atomic weight of F)/(molecular weight of a compound)×100.

3. The substrate according to claim 1, wherein the compounds (I) and (II) satisfy the relation of (molecular weight of the compound (I))/(molecular weight of the compound (11))>1.0.

4. The substrate according to claim 1, wherein the compound (I) is a compound represented by the following formula (IA):

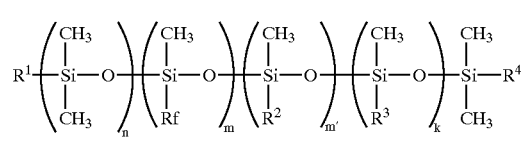

wherein each of $R^1$, $R^3$ and $R^4$ is a group represented by the following formula (1), provided that $R^1$, a k number of $R^3$'s and $R^4$ may be the same or different, $R^2$ is a $C_{2-16}$ monovalent organic group, provided that a m' number of $R^2$'s may be the same or different, Rf is a $C_{3-16}$ monovalent fluorine-containing organic group, provided that a m number of Rf's may be the same or different, each of n, m' and k is an integer of from 0 to 100, m is an integer of from 1 to 100, and n+m+m'+k is an integer of from 2 to 101;

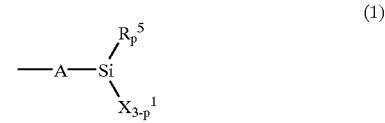

wherein A is a $C_{2-6}$ bivalent hydrocarbon group or an oxygen atom, $R^5$ is a $C_{1-10}$ monovalent hydrocarbon group, $X^1$ is an isocyanate group, a chlorine atom, a $C_{1-4}$ alkoxy group or a $C_{1-4}$ acyloxy group, provided that a p number of $R^5$'s may be the same or different, and a (3-p) number of $X^1$'s may be the same or different, and p is an integer of from 0 to 2.

5. The substrate according to claim 1, wherein the fluorine-containing reactive silane compound (II) is represented by the following formula (IIA) and/or (IIB):

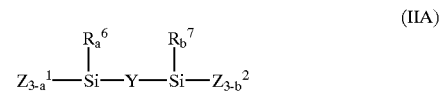

wherein each of $Z^1$ and $Z^2$ is a isocyanate group or a hydrolyzable group, provided that a (3-a) number of $Z^1$'s and a (3-b) number of $Z^2$'s may be the same or different, each of $R^6$ and $R^7$ is hydrogen, a $C_{1-12}$ organic group or a fluorine-containing organic group, provided that a a number of $R^6$'s and a b number of $R^7$'s may be the same or different, Y is a bivalent organic group, provided that at least one of the group of a a number of $R^6$'s, a b number of $R^7$'s and Y is a fluorine-containing organic group, and each of a and b is an integer of from 0 to 2;

wherein $R^8$ is hydrogen or a $C_{1-21}$ organic group, provided that a c number of $R^8$'s may be the same or different and at least one of a c number of $R^8$'s is a fluorine-containing organic group, $Z^3$ is an isocyanate group or a hydrolyzable group, and c is an integer of from 1 to 3.

6. A process for producing the substrate of claim 1, which comprises covering a surface of the substrate with a composition (III) to form the third layer, covering the surface of the third layer with the composition (II) to form the second layer, and covering the surface of the second layer with the composition (I) to form the first layer.

7. The substrate according to claim 1, wherein both compound (I) and compound (II) comprise one or more fluorine atoms and satisfy the relation of (fluorine content in the compound (I))/(fluorine content in the compound (II)) <0.8, where the fluorine content (%) is defined as ((the number of F atoms in a compound)×(atomic weight of F))/(molecular weight of a compound)×100.

8. The substrate according to claim 1, wherein compound (I) and compound (II) satisfy the relation of (molecular weight of the compound (I))/(molecular weight of the compound (II))>1.5.

9. The substrate according to claim 1, wherein the composition comprising the reactive silicon-containing compound (I) further comprises one or more organic solvents.

10. The substrate of claim 1, wherein the composition (II) further comprises an additive or compound selected from the group consisting of an ultra fine particle and a resin.

11. The substrate of claim 1, wherein the composition (II) further comprises an organic solvent.

12. The substrate of claim 1, wherein one or more of compound (I), compound (II) or compound (III) is present as a hydrolyzate.

13. The substrate of claim 1, wherein the entire thickness of the first layer, second layer, and third layer is at most 1,000 nm.

14. The substrate of claim 1, wherein the entire thickness of the first layer, second layer, and third layer is at most 100 nm.

15. The substrate of claim 1, wherein the substrate is selected from the group consisting of a metal, glass, ceramic, plastic and combinations thereof.

16. The substrate of claim 1, wherein compound (III) is $Si(NCO)_4$, compound (II) is $C_8F_{17}C_2H_4SiCl_3$, and compound (I) is represented by formula (2):

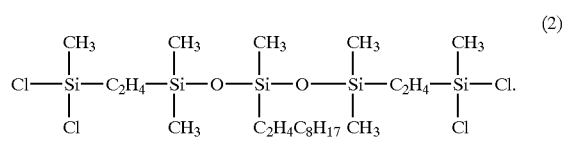

(2)